US010068250B2

(12) United States Patent
Gralla et al.

(10) Patent No.: US 10,068,250 B2
(45) Date of Patent: Sep. 4, 2018

(54) SYSTEM AND METHOD FOR MEASURING MOBILE ADVERTISING AND CONTENT BY SIMULATING MOBILE-DEVICE USAGE

(71) Applicant: Oracle America, Inc., Redwood Shores, CA (US)

(72) Inventors: Gabriel Gralla, Cambridge, MA (US); Daniel Rassi, Somerville, MA (US); Robert Crowell, New York, NY (US); Noah Goodhart, New York, NY (US); Jonah Goodhart, New York, NY (US); Aniq Rahman, New York, NY (US); Robert Miller, New York, NY (US); Paul Kiernan, New York, NY (US)

(73) Assignee: ORACLE AMERICA, INC., Redwood Shores, CA (US)

( * ) Notice: Subject to any disclaimer, the term of this patent is extended or adjusted under 35 U.S.C. 154(b) by 1077 days.

(21) Appl. No.: 14/213,623

(22) Filed: Mar. 14, 2014

(65) Prior Publication Data

US 2017/0316457 A1    Nov. 2, 2017

Related U.S. Application Data

(60) Provisional application No. 61/785,937, filed on Mar. 14, 2013.

(51) Int. Cl.
*G06Q 30/00* (2012.01)
*G06Q 30/02* (2012.01)

(52) U.S. Cl.
CPC ................... *G06Q 30/0254* (2013.01)

(58) Field of Classification Search
CPC ........................................ G06Q 30/02
USPC ............................... 705/14.41, 14.3
See application file for complete search history.

(56) References Cited

U.S. PATENT DOCUMENTS

| 6,108,637 | A | 8/2000 | Blumenau |
| 6,115,680 | A | 9/2000 | Coffee et al. |
| 6,151,608 | A | 11/2000 | Abrams |
| 6,230,204 | B1 | 5/2001 | Fleming, III |
| 6,327,619 | B1 | 12/2001 | Blumenau |

(Continued)

OTHER PUBLICATIONS

Weloved, "WebDesignServed," May 19, 2010, 2 pages, http://www.webdesignserved.com.

(Continued)

*Primary Examiner* — Sun M Li
(74) *Attorney, Agent, or Firm* — Kilpatrick Townsend & Stockton LLP

(57) ABSTRACT

A system and methods for simulating human usage of mobile devices by simulating human behavior patterns operating mobile devices and using the simulation of human usage to obtain advertising or other online content specific to certain entities that is displayed on the mobile devices. The advertising or other online content specific to the certain entities is transmitted to an analytics server, where the advertising or other online content is interpreted and deciphered to obtain particular elements that relate to the advertising and online content including, but not limited to, an identification of the specific entity, the size of the advertising or other online content, the locations where the advertising or other online content appears, and the path by which the advertising or other online content travels to the mobile devices for display.

23 Claims, 8 Drawing Sheets

(56) References Cited

U.S. PATENT DOCUMENTS

| | | | |
|---|---|---|---|
| 6,418,470 B2 | 7/2002 | Blumenau | |
| 6,778,982 B1 | 8/2004 | Knight et al. | |
| 7,263,497 B1 | 8/2007 | Wiser et al. | |
| 7,310,609 B2 | 12/2007 | Middleton, III et al. | |
| 7,386,473 B2 | 6/2008 | Blumenau | |
| 7,613,635 B2 | 11/2009 | Blumenau | |
| 7,660,737 B1 | 2/2010 | Lim et al. | |
| 7,716,326 B2 | 5/2010 | Blumenau | |
| 7,756,974 B2 | 7/2010 | Blumenau | |
| 7,917,755 B1 | 3/2011 | Giliyaru | |
| 8,108,245 B1 | 1/2012 | Hosea | |
| 8,255,491 B1 | 8/2012 | Arzur | |
| 8,266,115 B1 | 9/2012 | Park | |
| 8,386,314 B2 | 2/2013 | Kirkby et al. | |
| 8,508,532 B1 | 8/2013 | Logan | |
| 8,880,996 B1 | 11/2014 | Deshpande | |
| 9,282,048 B1 | 3/2016 | Fichter et al. | |
| 2002/0098891 A1 | 7/2002 | Graham et al. | |
| 2002/0103698 A1 | 8/2002 | Cantrell | |
| 2002/0111865 A1 | 8/2002 | Middleton, III | |
| 2002/0165773 A1 | 11/2002 | Natsuno et al. | |
| 2003/0200145 A1 | 10/2003 | Krassner et al. | |
| 2005/0210533 A1 | 9/2005 | Copeland et al. | |
| 2005/0235030 A1 | 10/2005 | Lauckhart et al. | |
| 2006/0026063 A1 | 2/2006 | Collins | |
| 2006/0080681 A1 | 4/2006 | Anwar et al. | |
| 2007/0039018 A1 | 2/2007 | Saslow et al. | |
| 2007/0050251 A1 | 3/2007 | Jain et al. | |
| 2007/0255702 A1 | 11/2007 | Orme | |
| 2007/0266305 A1 | 11/2007 | Cong et al. | |
| 2008/0004958 A1 | 1/2008 | Ralph et al. | |
| 2008/0010122 A1* | 1/2008 | Dunmire | G06Q 30/02 705/14.55 |
| 2008/0114709 A1 | 5/2008 | Dixon | |
| 2008/0120165 A1 | 5/2008 | Yan | |
| 2008/0320125 A1 | 12/2008 | O'Sullivan et al. | |
| 2009/0076899 A1 | 3/2009 | Gbodimowo | |
| 2009/0150500 A1 | 6/2009 | Kumar et al. | |
| 2009/0157813 A1 | 6/2009 | Jung et al. | |
| 2009/0187546 A1 | 7/2009 | Hamilton Whyte | |
| 2009/0216621 A1 | 8/2009 | Anderson | |
| 2009/0265243 A1 | 10/2009 | Karassner et al. | |
| 2009/0271260 A1 | 10/2009 | Sharma et al. | |
| 2010/0023868 A1 | 1/2010 | Bonforte et al. | |
| 2010/0095317 A1 | 4/2010 | Toebes et al. | |
| 2010/0121676 A1 | 5/2010 | Jackson | |
| 2010/0146380 A1 | 6/2010 | Rousso et al. | |
| 2010/0169792 A1 | 7/2010 | Ascar et al. | |
| 2010/0241597 A1 | 9/2010 | Chen et al. | |
| 2010/0251128 A1 | 9/2010 | Cordasco | |
| 2010/0287054 A1 | 11/2010 | Zohar et al. | |
| 2010/0293031 A1 | 11/2010 | Jacobs et al. | |
| 2010/0295774 A1 | 11/2010 | Hennessey | |
| 2010/0310175 A1 | 12/2010 | Holt | |
| 2011/0029393 A1 | 2/2011 | Apprendi et al. | |
| 2011/0072131 A1 | 3/2011 | Zohar et al. | |
| 2011/0087966 A1 | 4/2011 | Leviathan | |
| 2011/0125587 A1 | 5/2011 | Netzer et al. | |
| 2011/0137737 A1 | 6/2011 | Baird et al. | |
| 2011/0163971 A1 | 7/2011 | Wagner et al. | |
| 2011/0239243 A1 | 9/2011 | Dierks et al. | |
| 2011/0320286 A1 | 12/2011 | Zohar et al. | |
| 2012/0078707 A1 | 3/2012 | Ramakrishnan et al. | |
| 2012/0106793 A1 | 5/2012 | Gershenson et al. | |
| 2012/0239489 A1 | 9/2012 | Peretti et al. | |
| 2012/0284738 A1 | 11/2012 | Narasimhan et al. | |
| 2012/0317472 A1 | 12/2012 | Chernysh | |
| 2012/0324098 A1 | 12/2012 | De Jager et al. | |
| 2013/0031470 A1 | 1/2013 | Daly, Jr. et al. | |
| 2013/0124342 A1 | 5/2013 | Virkar et al. | |
| 2013/0145384 A1* | 6/2013 | Krum | H04N 21/44218 725/10 |
| 2013/0205314 A1 | 8/2013 | Ramaswamy et al. | |
| 2013/0238423 A1 | 9/2013 | Pottjegort | |
| 2013/0335576 A1 | 12/2013 | Gotschlich | |
| 2014/0040786 A1 | 2/2014 | Swanson et al. | |
| 2014/0181634 A1 | 6/2014 | Compain | |
| 2014/0282642 A1 | 9/2014 | Needham et al. | |
| 2015/0066940 A1 | 3/2015 | Fernandes et al. | |

OTHER PUBLICATIONS

Weloved.com Welovead, dated Mar 7, 2011, 14 pages, http://web.archive.org/web/2011 0307041600/http://www.welovead.com/en/works/database.

* cited by examiner

SYSTEM AND METHOD FOR MEASURING MOBILE ADVERTISING AND CONTENT BY SIMULATING MOBILE-DEVICE USAGE

CROSS-REFERENCE TO RELATED APPLICATIONS

The present application claims the benefit under 35 U.S.C. § 119(e) of U.S. Provisional Application Ser. No. 61/785,937, entitled "System and Method for Measuring Mobile Advertising and Content by Simulating Mobile-Device Use," filed on Mar. 14, 2013, the entire contents of which are incorporated herein by reference.

BACKGROUND OF THE INVENTION

1. Field of the Invention

The present invention relates to a system and methods for gathering online advertisements or other web content for display on mobile communication or computing devices, via the Internet and telephone networks, by simulating human usage of the mobile communication or computing devices, including but not limited to, cellular telephones, tablet devices, or wearable devices, each using a computing device or a computing device connected to an actual mobile device.

2. Description of the Related Art

The Internet and other types of on-line communication have become increasingly popular to the point where they now compete with traditional media such as print media and broadcast media for the attention of users. Due to the large number of web pages available for users to view worldwide, online content creation and publication have become a huge business.

With this growth, it is advantageous for various parties in the online advertising and publishing industries to obtain information about what is being advertised, when, how, where, and by whom, and to understand the content that creates the context for advertising. The complexity of the infrastructure that facilitates online advertising combined with the low transparency of business dealings in the online advertising world makes it difficult to determine the advertising strategies used by other companies other than one in which one is involved.

Existing systems in the online advertising arena collect advertisements and content from web pages sent to conventional PC (personal computer) browsers. Currently, there exist no methods that facilitate collecting useful information when such information is provided to mobile browsers and applications. Yet, more and more, users rely on their mobile devices to access, browse, and view online content including advertisements and content from web pages.

It would therefore be advantageous to create a mechanism and/or process by which comprehensive information or a complete picture may be obtained of advertising and other web content display strategies or scenarios that are used, for example, how advertising is planned and executed across the web or in distributed network of websites, particularly for display on mobile devices.

SUMMARY OF THE INVENTION

In one innovative aspect, the present invention provides a system and methods configured to present requests to web servers, simulated to invoke responses from web servers for mobile telephones or such devices. In accordance with some embodiments, the requests, although transmitted from a computer or a telephone connected to a computer, simulate mobile telephone operations (and mobile web access protocols) for accessing web servers to obtain online content. By this mechanism, large quantities of data may be collected in a timely manner to provide a reasonably accurate assessment of the mobile advertising scenarios used by certain entities, wherein the entities may be advertisers, publishers, or companies involved with either measuring or serving advertising content. The present invention provides a complete picture of how advertising is planned and executed across the web, particularly for mobile devices.

In some implementations, the present invention provides a system that comprises at least four components. A first component of the system is a mobile telephone and tablet simulator, which is configured either as a computer or software program operating on a computer or such electronic device or alternatively, an electronic device controlled by a computer or software program configured to accept input created or generated by other computer or software programs, yet behaving on its network-facing interface like any other mobile telephone or tablet. The web servers serving requests from this simulator device perceive that the requests are transmitted by a human using a mobile telephone, requesting an action relating to a web page or application. The mobile telephone and tablet simulator is devised to do anything a human can do with respect to input, location, web browsing, email collection, etc., on a mobile telephone or tablet device. The results of any request by the mobile telephone and tablet simulator are stored in a database and are made available to other computer programs that are configured to examine the outcomes of those requests. A second component of the system is a human-behavior generator, which manifests the logic schemes devised to simulate the requests humans may pose from their respective telephones or such mobile devices. Requests made by the mobile telephone and tablet simulator are constructed by the human-behavior generator to statistically model the measured behaviors of humans in aggregate. This creates a weighted sample that can approximate the volume of advertising or content in aggregate. A third component of the system is the analytic programming logic configured to examine data that has been collected by the mobile and tablet simulator, which is configured to find or discover relevant assets in the data such as advertisements or content and makes the data ready for presentation. The fourth component of the system includes the program schemes or software that actually present the data gathered and collected and that conduct certain analysis to summarize the data gathered and collected.

In some embodiments, the methods of the present invention implemented on one or more computing devices include identifying advertising or content specific to entities, by operations directed to simulating human usage of different types of mobile devices. Human use may be simulated by simulating human behavior that is typical or normal for operating mobile devices. In some instances, the mobile devices may be simulated versions rather than real mobile telephones. In some instances, human usage is simulated to obtain advertising or content specific entities that are displayed on the mobile devices. The methods are configured to collect the advertising for specific or certain entities and any information about the advertising from the mobile devices, which are transmitted to an analytics server. The analytics server interprets and deciphers the elements relating to the advertising, including an identity of the entity (advertiser, publisher, or company involved in either measuring or serving the advertising), the size of one or more advertisements or content, the place or location where the one or more advertisements or content appeared, the path by which the one or more advertisements traveled for display to the mobile device, in the simulated or the real versions of the mobile device. The path may also include an indication of the buying process that purchased the advertising.

The system and methods of the present invention may be implemented on one or more computer program products and may provide a user interface for display to a user, wherein the user interface enables users to use tools to view advertising and other online content on mobile devices and otherwise provide data that may be used in the system and methods of the present invention.

BRIEF DESCRIPTION OF THE DRAWINGS

The present invention is illustrated by way of example, and not by way of limitation in the figures of the accompanying drawings in which like reference numerals are used to refer to similar elements.

DETAILED DESCRIPTION OF EMBODIMENTS

Figure 1:
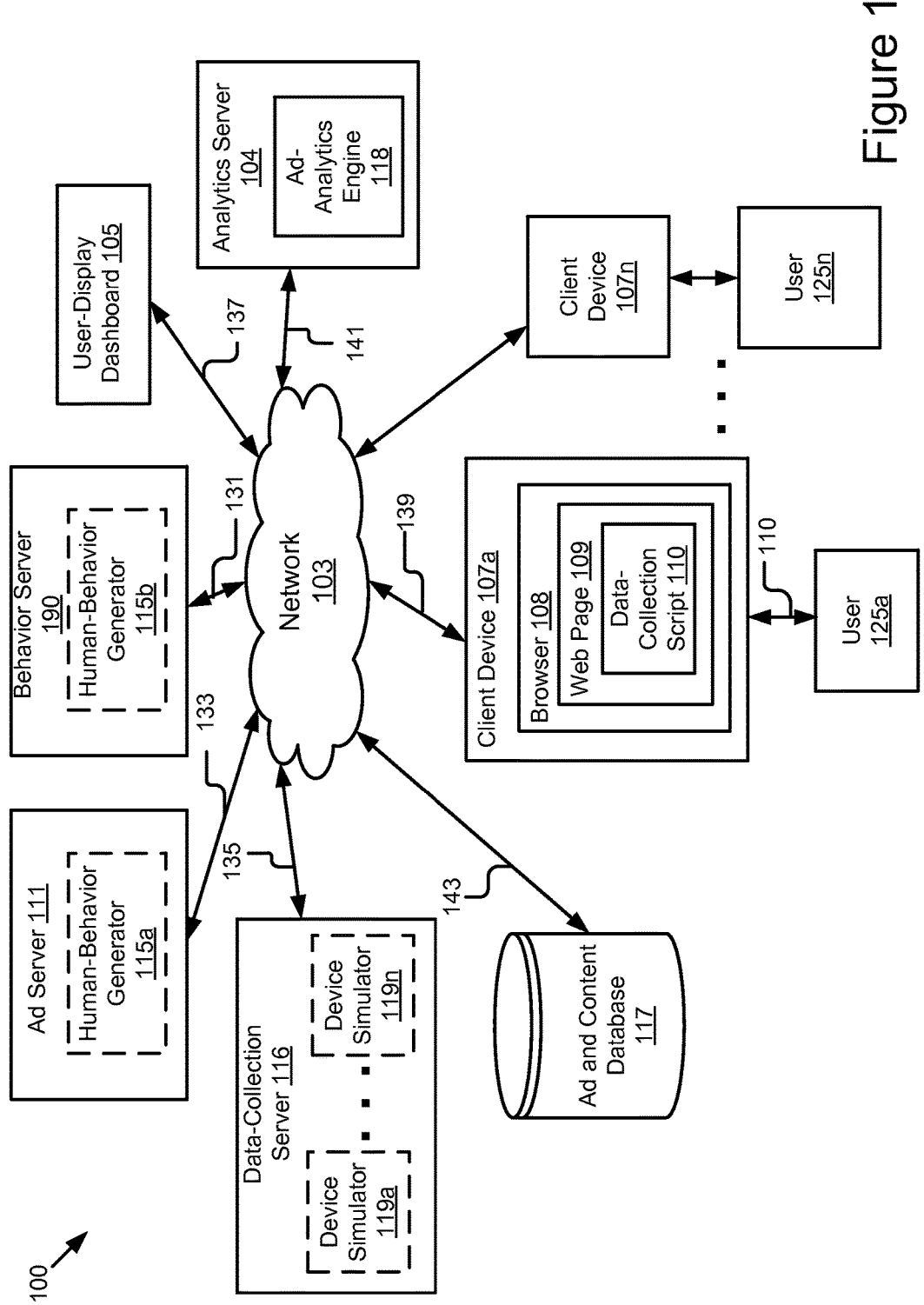
FIG. 1 illustrates an overall architecture of the system in accordance with the present invention for gathering online advertisements or other web content, via the Internet and telephone networks, by simulating human use of mobile communication or computing devices, including but not limited to, cellular telephones, tablet devices, or wearable devices, each using a computing device or a computing device connected to an actual mobile device.

FIG. 1 illustrates a block diagram of one embodiment of the system 100 for presenting requests to web servers in a distributed and networked environment, wherein the requests are simulated to appear as if they are made by mobile devices. Mobile web access is dictated by mobile protocols involving fragmentation of mobile devices, mobile operating systems, and browsers, the latency of over-the-air data transmission etc. The system 100 gathers information or data relating to online advertising or other online content based on requests that are simulated to represent inquiries from mobile devices. These simulated requests invoke responses from web servers for mobile telephones or such mobile electronic devices. The responses convey data that is used to evaluate or measure display of online advertising and web content on mobile devices.

The system 100 and methods of the present invention described here either utilize or are operated on one or more computing systems (with one or more computers, processors, and data storage devices) that are configured to communicate in a distributed environment. For many examples described in the specification below, online content or online advertising can be any text, picture, or video created and/or published by publishers on web pages which are accessible to users over the Internet. Furthermore, for many examples in the specification below, an online advertisement ("ad") is any text, picture or video the purpose of which is advertising communication including any flash asset, any image of Internet Advertising Board (IAB) or industry standard width and height that is clickable including any recursion into iframes from the original page.

The distributed environment of the illustrated system 100 includes an Analytics (or analytics) server 104, a User-Display Dashboard (or user-display dashboard) 105, an Ad (or ad) server 111, a Data-Collection Server (or data-collection server) 116, a Behavior Server 190, and one or more Client Devices (client devices) 107a-107n that are configured for access by users 125a-125n. The illustrated system 100 also includes an Ad-and-Content Database (or ad-and-content database) 117. In the illustrated embodiment, these entities are communicatively coupled via a network 103. Although only two client devices 107a-n are illustrated, it should be recognized that any number of client devices 107n are available to any number of users 125n. Furthermore, while only one network 103 is coupled to the analytics server 104, the user-display dashboard 105, the ad server 111, the data-collection server 116, the behavior server 190, and the ad-and-content Database 117, and the one or more client devices 107a-107n, in practice any number of networks 103 can be connected to these entities. In one embodiment, the analytics server 104, the ad server 111, the data-collection server 116, and the behavior server 190 are hardware servers including a processor, memory, and network communication capabilities.

The system 100 is configured to gather data for measurement in real time or otherwise, by obtaining online data for mobile usage. Each of the client devices 107a-107n has a data-collection script 110 that is either, installed, downloaded, or otherwise embedded in the client devices 107a-107n. The data-collection script 110 operates on each web browser 108 or application on any client or user's device 107a, 107b, or 107n. This data collection script 110 may be installed on each browser or application and is configured with a capability to gather data relevant to human use of mobile devices.

In operation, the data collection script 110 configured to run on a web page 109, renders in the browser 108 on a client device 107 a-n. It may be loaded from a script server (not shown) and begins to execute. The data collection script 110 once loaded operates to receive data relevant to mobile telephone use. In one embodiment, the data collection script 110 may be embedded on the web browser 108 by a script server or other such server configured with this capability. In another embodiment, the data collection script 110 may be placed on the web browser 108 by the ad server 111. In yet another embodiment, the data collection script 110 may be embedded on the web browser 108 by a content server (not shown) or the behavior server 190.

The network 103 is a conventional type, wired or wireless, and may have any number of configurations such as a star configuration, token ring configuration or other configurations. Furthermore, the network 103 may comprise a local area network (LAN), a wide area network (WAN) (e.g., the Internet), and/or any other interconnected data path across which multiple devices may communicate. In yet another embodiment, the network 103 may be a peer-to-peer network. The network 103 may also be coupled to or includes portions of a telecommunications network for sending data in a variety of different communication protocols. In yet another embodiment, the network 103 includes Bluetooth communication networks or a cellular communications network for sending and receiving data such as via short messaging service (SMS), multimedia messaging service (MMS), hypertext transfer protocol (HTTP), direct data connection, WAP, email, etc.

The client device 107a is representative of client devices 107a-107n and may be a conventional computer, for example, a personal computer that is used to represent a conventional type of mobile computing device, for example, cellular telephones, tablet devices, or wearable devices, each using a computing device or a computing device connected to an actual mobile device. The client devices 107a-107n, are coupled to the network 103 by signal lines 116a-116n, respectively. In one embodiment, the client device 107 is coupled to receive (e.g., download or otherwise view) content with online advertisements from the ad server 111 and other content from publishing sites or third party servers (not shown) but coupled in the illustrated distributed environment. The client device 107 includes the web browser 108 for presenting web pages 109 including online content and advertisements to the user or client 125a through 125n for viewing on their respective client devices 107a-107n. The web browser 108 on each of the client or user device 107a-107n presents advertisements and other online content, and receives input from the user or client 125a-125n as represented by signal lines 110a-110n. The signal lines 110a-110n represent interactions of the users, 125a-125n, with their respective devices 107a-107n (e.g., viewing or manipulating tools to receive or control viewing of the online content). The web browser 108 and the data collection script 110 are operable on the client devices 107a through 17n.

The data collection server 116 is a web-connected server, within which multiple simulators reside and are configured to operate. A simulator may be only software or alternatively a physical device connected to a software simulator. In the illustrated embodiment, the simulators are referred to as device-simulators 119a through 119n. It should be recognized that any number of device simulators may be included and configured to behave as if they were humans with mobile devices making requests of web servers. In some implementations, the device simulators 119a through 119n are configured to access the web, while simulating human behavior, and request from web servers, content and advertising, which is transmitted back to the device simulators 119a through 119n. The device simulators 119a through 119n store the data returned to them in the ad and content database 117. The ad and content database 117 is an example of a storage facility that is connected to the network 103, for storing data collected by any one or more of the device simulators 119a through 119n. The ad and content database 117 is discussed in greater detail below.

The ad server 111 and/or the behavior server 190 comprises a human behavior generator 115a or 115b, which is a program operating on a web-connected server that instructs the array of device simulators 119a through 119n to similar appropriate behavior to obtain data, which applications to simulate, and what behavior patterns to simulate. The human-behavior generator 115a through 115b may instruct the device simulators 119a through 119n to act like humans in any number of ways, including but not limited to, data entry, clicking, gestures, scrolling, shaking, changing location, and talking, etc. The human-behavior generator, any or all of 115a through 115n, are configured to maintain a model and heuristics for how a population uses cellular telephones. These examples of human use may include gaming applications, use of maps, telephone calls, web browsing, etc. The human-behavior generator instructs each simulator 119a through 119n on how to behave as it accesses the web or other networks used by the telephones or telephonic devices that are simulated.

The ad server 111 is a computer program running on a hardware system for placing advertisements on websites and/or placing the data collection script 110 on web pages 109. For example, the ad server 111 may be a web server that receives advertisements from an ad preparation server (not shown) or an advertising asset server (not shown) and delivers them to users or clients (107a-107n) or viewing websites. The ad server 111 is coupled to the network 103 by signal line 133 for receiving ads from the ad preparation server (not shown) or the advertising asset server (not shown) and for delivering the ads to third party servers, sites or domains (not shown).

The data collection server 116 is a computer program running on a hardware system for collecting data flow of samples that are obtained by the data collection scripts 110. For example, the data collection server 116 may be a web server that receives and gathers sample data flow from various components in the distributed environment. The data collection server 116 is coupled to the network 103, by signal line 135, for communication with the other components of the system 100.

The behavior server 190 is a computer program running on a hardware system for simulating human behavior patterns. The behavior server 190 is coupled to the network 103, by signal line 131, for communication with the other components of the system 100.

The analytics server 104 is a computer program running on a hardware system for measuring and analyzing the data received that is relevant to simulating human behavior patterns. The analytics server 104 is coupled to the network 103, by signal line 141, for communication with the other components of the system 100. The analytics server 104 is a web-connected server, including an ad-analytics engine 118 with programs for organizing and analyzing the collected data.

The user display dashboard 105 is a networked server with programs that display the results of the data collection showing details and summaries of publishers, advertisements, content elements, tags, counts of ads by advertiser and creative, etc. In some implementations, the user display dashboard 105 is configured to access the information organized and stored by the analytics server 104 and presents various aspects of this data, as requested by users of the system 100.

The Ad-and-Content database 117 is data storage for storing content and other data as illustrated in further detail with reference to FIG. 8. The Ad and Content database 117 is coupled by signal line 143 to the other components of the system 100 coupled by network 103. The Ad-and-Content storage 117 stores data, information, and instructions used by the system 100. Such stored information includes information about users, publishers, ads, assets and other information. In one embodiment, the Ad-and-Content storage 117 stores data received by simulating human use of mobile telephones as well as data generated during intermediate processes. In one embodiment, the Ad-and-Content database 117 is of conventional type. The Ad-and-Content database 117 is a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device for storing information on a more permanent basis.

Figure 2:
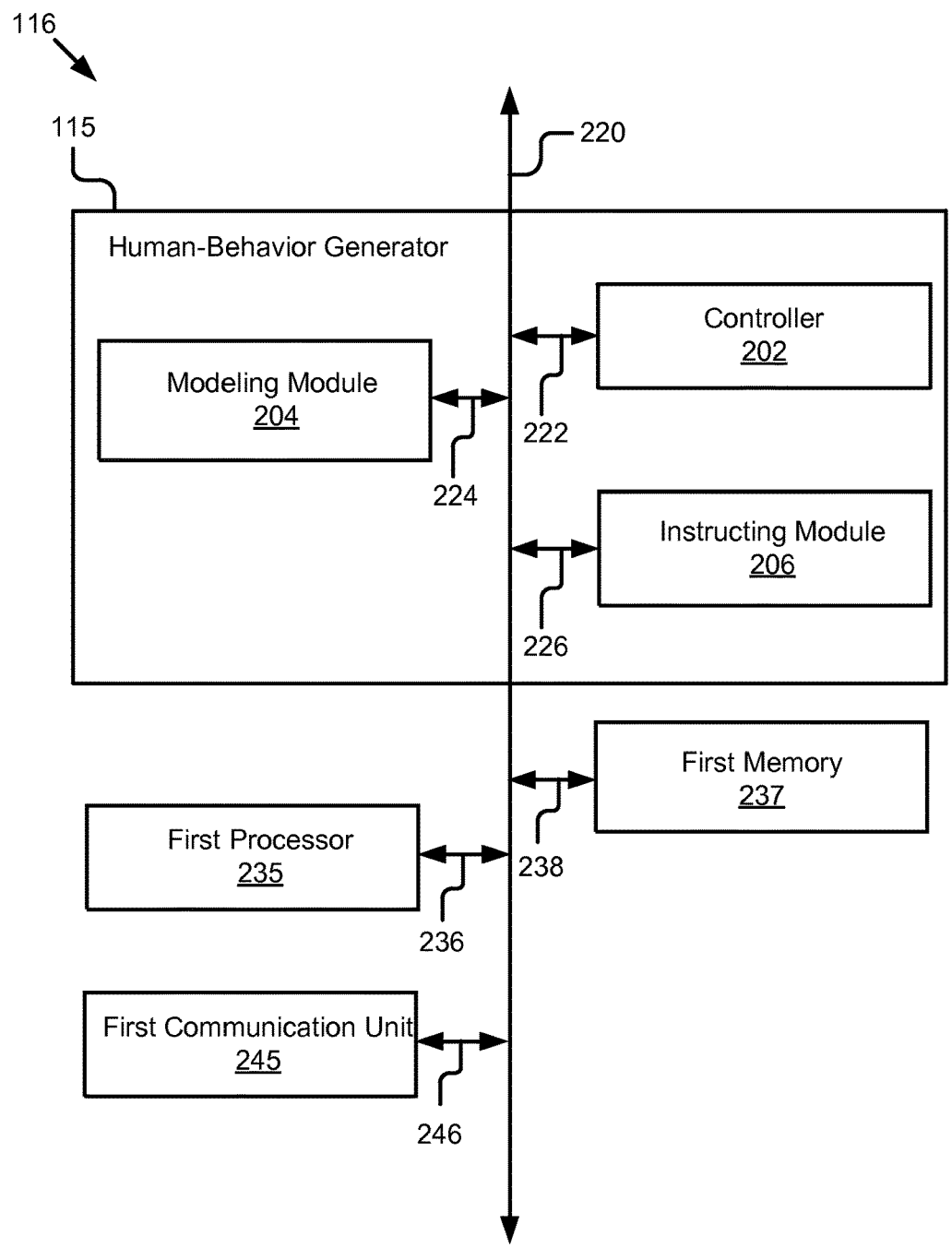
FIG. 2 is a block diagram illustrating various hardware/software components of an example user-behavior generator in accordance with the present invention.

FIG. 2 is a block diagram of example hardware components of the behavior server 190 with a human-behavior generator 115a through 115b, which resides in either the behavior server 190 or the data-collection server 116. The human-behavior generator 115a through 115b represent a computing system dedicated to determine or measure user-behavior on web-connected mobile devices for viewing advertisement or other online content. In this embodiment, the behavior server 190 comprises: a first processor 235, a first memory 237 and a first communication unit 245, which may be a network I/F module. The first processor 235 comprises an arithmetic logic unit, a microprocessor, a general-purpose controller or some other processor array to perform computations and provide electronic display signals to a display device. The first processor 235 is coupled to the bus 220 for communication with the other components via a signal line 236. The first processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2 (as designated by reference to a first processor), multiple processors may be included. Other processors, operating systems, sensors, displays and physical configurations are possible.

The first memory 237 stores instructions and/or data that may be executed by the first processor 235. The first memory 237 is coupled to the bus 220 via a signal line 238 for communication with the other components. The instructions and/or data may comprise code for performing any and/or all of the techniques described herein. The first memory 237 may be a dynamic random access memory (DRAM) device, a static random access memory (SRAM) device, flash memory or some other memory device.

The first communication unit 245, as illustrated, is coupled to network 103, by a signal line 246, and is coupled to the bus 220. The first communication unit 245 includes ports for wired connectivity such as but not limited to USB, SD, or CAT-5, etc. The first communication unit 245 links the first processor 235 to the network 103 that may in turn be coupled to other processing systems. The first communication unit 245 is configured to provide other connections to the network 103, using standard network protocols such as TCP/IP, HTTP, HTTPS and SMTP. In other embodiments, the first communication unit 245 includes a transceiver for sending and receiving signals using Wi-Fi, Bluetooth® or cellular communications for wireless communication. The first communication unit 245 provides a communication path for the components of the client device 107a-n to the network 103 and other systems.

The human-behavior generator 115a-115b includes a modeling module 204, a controller 202, and an instruction module 206. The modeling module 204 is software, code, for simulating requests made by the mobile telephone and tablet simulators that are constructed to statistically model the measured behaviors of humans in aggregate. The modeling module 204 creates a weighted sample that can approximate the volume of advertising or content in aggregate.

The controller 202 is software, code or routines for controlling the operations of the human-behavior generator 115a or 115b. Further, the controller 202 instructs communication between the modeling module 204 and the instruction module 206.

The instruction module 206 is software, code or routines for providing instructions for modeling by the modeling module 204.

Figure 3:
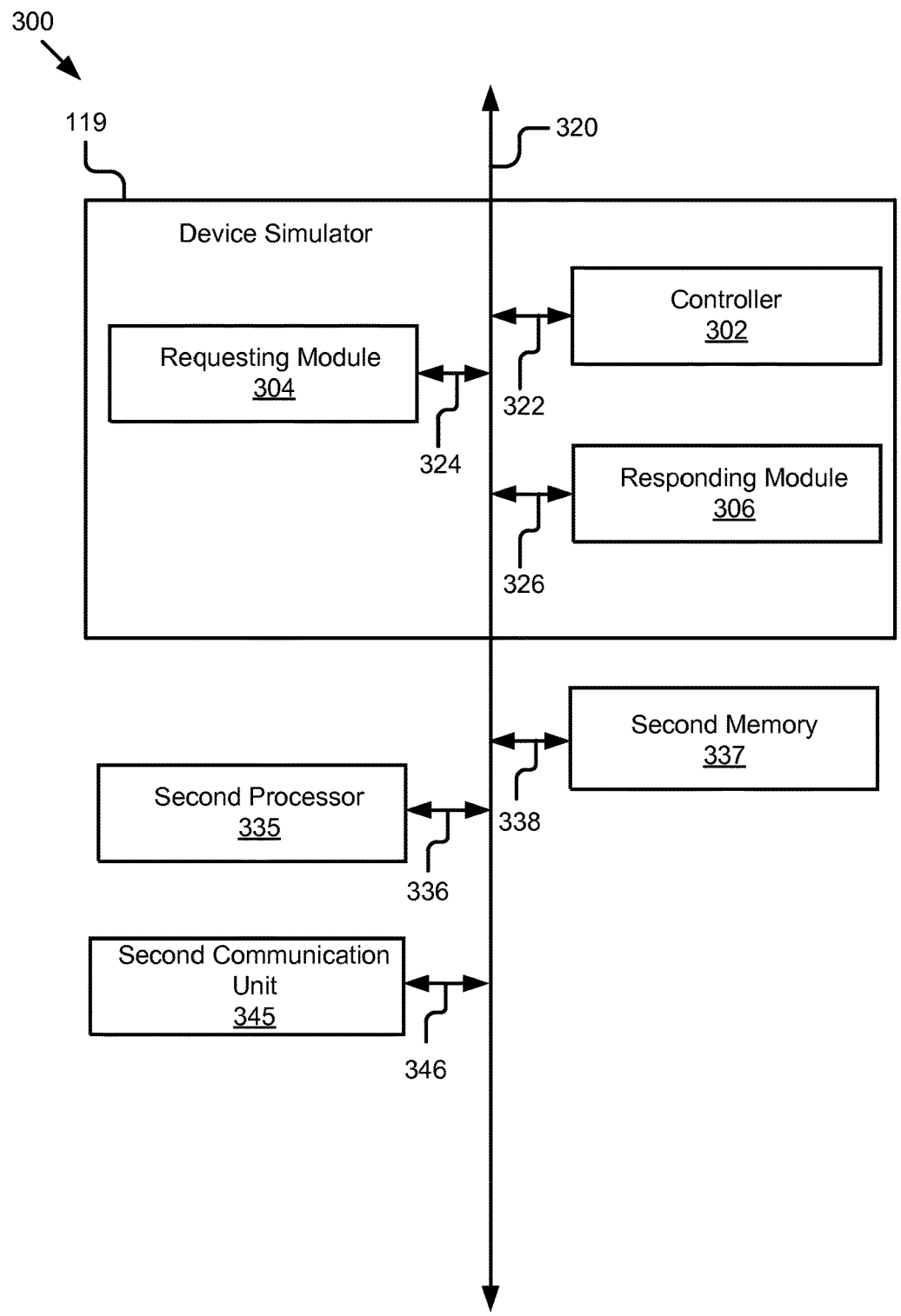
FIG. 3 is a block diagram illustrating various hardware/software components of an example device simulator in accordance with the present invention.

FIG. 3 illustrates an example device simulator 119a-119n within either a data-collection server 116. The data-collection server 116 includes a second processor 335, a second memory 337, and a second communication unit 345.

The second processor 335 comprises an arithmetic logic unit, a microprocessor, a general-purpose controller or some other processor array to perform computations and provide electronic display signals to a display device. The second processor 335 is coupled to the bus 320 for communication with the other components via a signal line 336. The second processor 335 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2 (as designated by illustration of a single processor), multiple processors may be included. Other processors, operating systems, sensors, displays and physical configurations are possible.

The second memory 337 stores instructions and/or data that may be executed by the first processor 335. The second memory 337 is coupled to the bus 320 via a signal line 338 for communication with the other components. The instructions and/or data may comprise code for performing any and/or all of the techniques described herein. The second memory 337 may be a dynamic random access memory (DRAM) device, a static random access memory (SRAM) device, flash memory or some other memory device.

The second communication unit 345, as illustrated, is coupled to network 103, by a signal line 346, and is coupled to the bus 320. The second communication unit 345 includes ports for wired connectivity such as but not limited to USB, SD, or CAT-5, etc. The second communication unit 345 links the second processor 335 to the network 103 that may in turn be coupled to other processing systems. The second communication unit 345 is configured to provide other connections to the network 103, using standard network protocols such as TCP/IP, HTTP, HTTPS and SMTP. In other embodiments, the second communication unit 345 includes a transceiver for sending and receiving signals using Wi-Fi, Bluetooth® or cellular communications for wireless communication. The second communication unit 345 provides a communication path for the components of the client device 107a-n to the network 103 and other systems.

The device simulator 119a-119n comprises a controller 302, which is software, code, or routines for handling communications between the device simulator 119a-119n and other components of the data-collection server 116. For example, the controller 302 is coupled to the bus 320 by signal line 322 to control the simulated requests of mobile use by request module 304 and the responses provided by the response module 306.

The request module 304 is software, code or routines for making inquiries and requests as if by mobile devices. The response module 306 is configured for receiving responses from the web servers.

Figure 4:
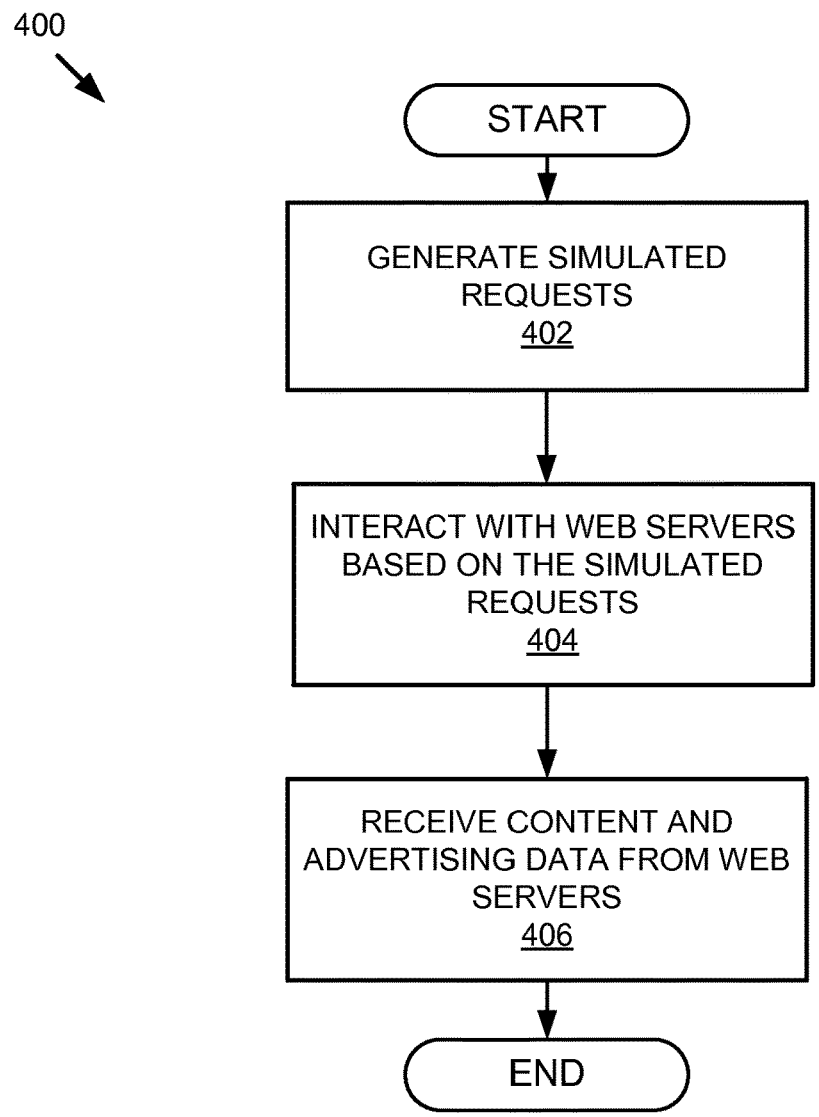
FIG. 4 is an example flowchart of an example general method for generating simulated requests from mobile devices and receiving online content and advertising data from web servers in accordance with the present invention.

Referring now to FIG. 4, one embodiment of a general method 400 in accordance with the present invention, for gathering online advertisements or other web content via the Internet and telephone networks, by simulating human use of mobile communication or computing devices, including but not limited to, cellular telephones, tablet devices, or wearable devices, each using a computing device or a computing device connected to an actual mobile device is illustrated. The method 400 begins with one or more operations designated by block 402, for generating simulated requests for data relating to online content (e.g., advertisements or other content elements) on a web page 109 that is rendered. The method 400 proceeds and in accordance with one or more operations designated by block 404 interacts with web servers based on the simulated requests. The method 400 proceeds to the next block 406 including one or more operations for receiving content and advertising data from web servers. The method 400 proceeds to an indication of "END," which is simply to illustrate an end to the sequence of operations described above. It should be recognized that the method 400 described is by way of example and it may either include additional operations not described here or exclude any of the operations that are described.

Figure 5:
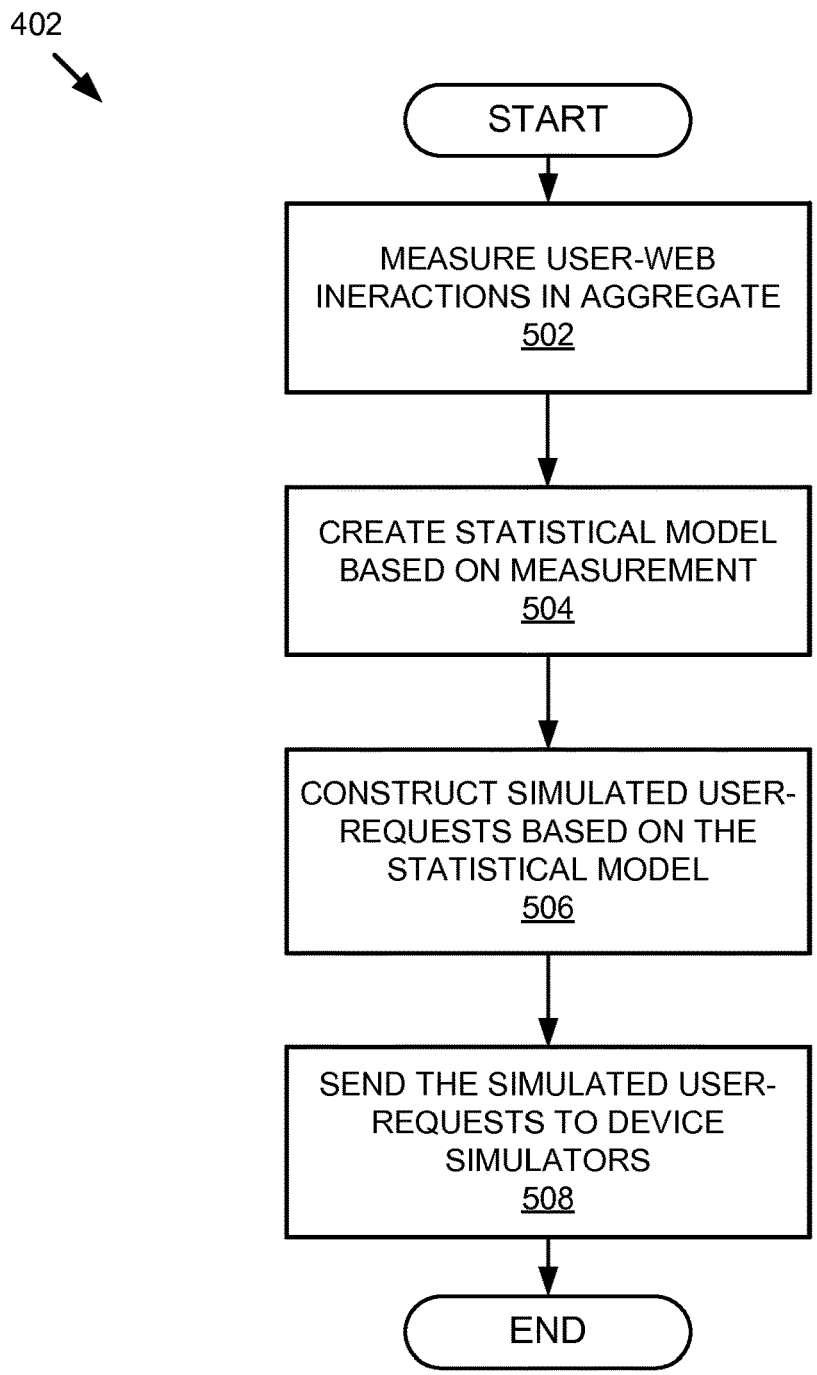
FIG. 5 is a flowchart of an example method illustrating operations for measuring user-web interactions (from mobile devices) in aggregate to create a statistical model and using the statistical model for constructing simulated user-requests.

Referring now to FIG. 5, an example method 402 (from FIG. 4) illustrating the process for generating simulated requests is illustrated and described. The method 402 begins by one or more operations designated by block 502 for measuring user-web interactions in aggregate. The method 402 proceeds to the next block 504, including one or more operations for creating a statistical model based on measurement. The method 402 proceeds to the next block 506, including one or more operations for constructing simulated user-requests based on the statistical model. The method 402 proceeds to the next block 508, including one or more operations for sending the simulated user-requests to device simulators. The method 500 proceeds to an indication of "END," which is simply to illustrate an end to the sequence of operations described above. It should be recognized that the method 500 described is by way of example and it may either include additional operations not described here or exclude any of the operations that are described.

Figure 6:
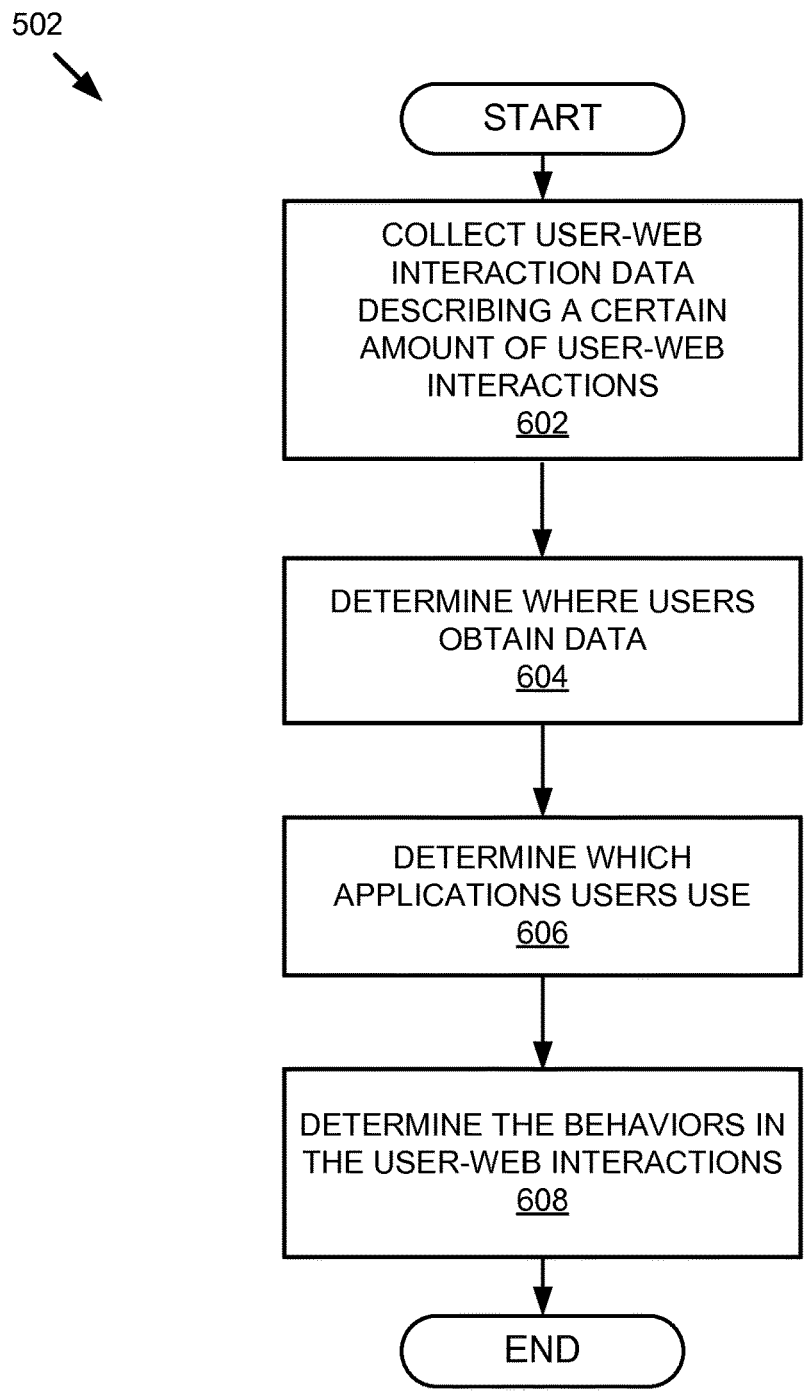
FIG. 6 is a flowchart of an example method illustrating operations for collecting user-web interaction data and determining user behavior patterns in accordance with the present invention.

Referring now to FIG. 6, an example method 502 (from FIG. 5) illustrating operations for collecting user-web interaction data is described. The method 502 begins and proceeds to a block 602 including one or more operations for collecting user-web interaction data informing on user-web interactions. The method 502 proceeds to the next block 604 for determining where users obtain data. The method 502 proceeds to the next block 606 including one or more operations for determining applications used by users. The method 502 proceeds to the next block 608 including one or more operations for determining behavior patterns derived from user-web interactions. The method 502 proceeds to an indication of "END," which is simply to illustrate an end to the sequence of operations described above. It should be recognized that the method 502 described is by way of example and it may either include additional operations not described here or exclude any of the operations that are described.

Figure 7:
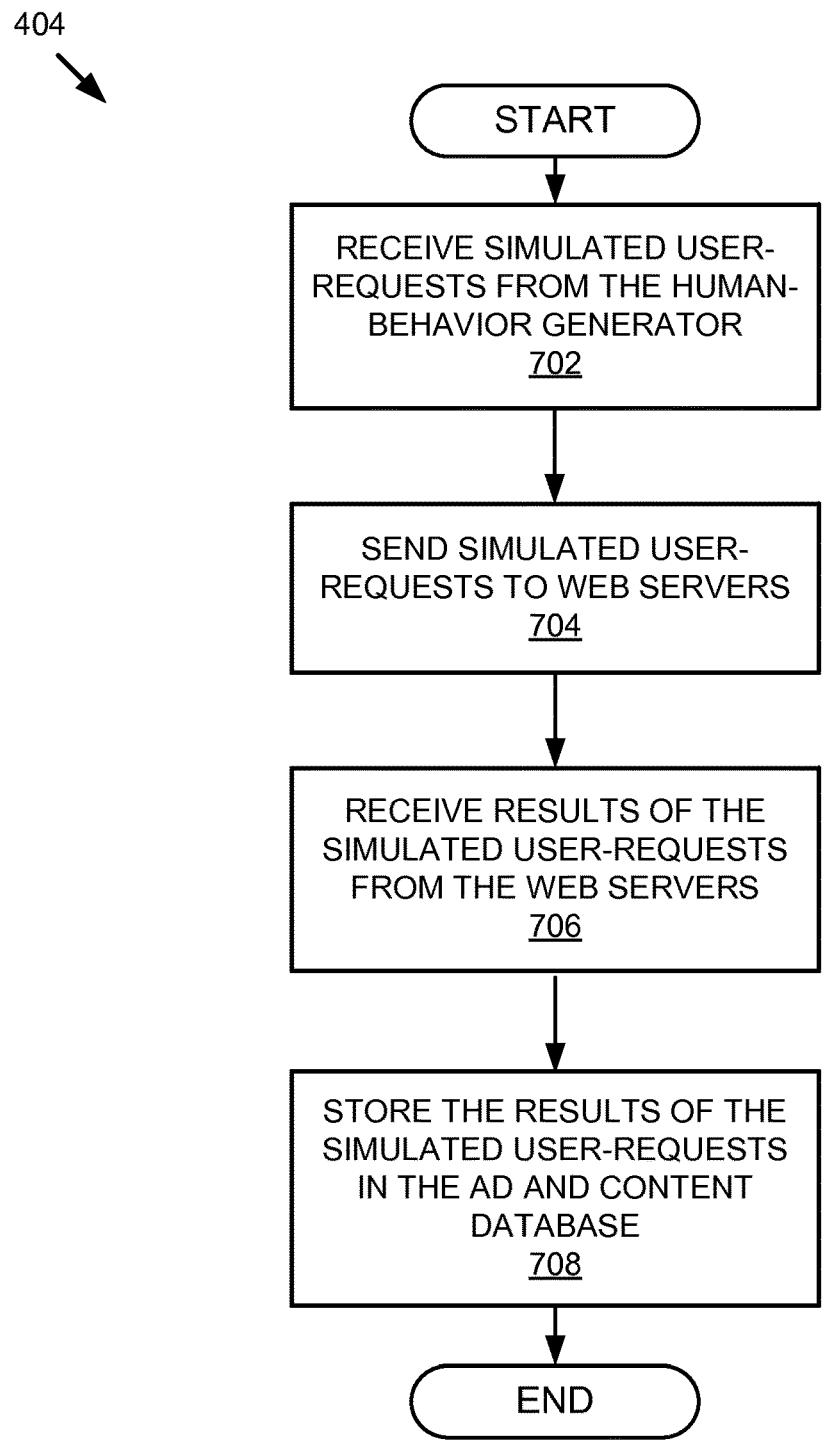
FIG. 7 is a flowchart of an example method illustrating operations for receiving simulated user-requests from a human-behavior generator and obtaining results from web servers based on these simulated user-requests.

Referring now to FIG. 7, an example method 404 (from FIG. 4) illustrating operations for simulating user-requests from a human-behavior generator and obtaining results from web servers based on these simulated user-requests is described. The method 404 begins and proceeds to a block 702, including one or more operations for receiving simulated user-requests from the human-behavior generator (e.g., human-behavior generator 115a and 115b). The method 404 proceeds to the next block 704 including one or more operations for sending simulated user-requests to web servers. The method 404 proceeds to the next block 706 including one or more operations for receiving results of the simulated user-requests from the web servers. The method 404 proceeds to the next block 708 including one or more operations for storing the results of the simulated user-requests in the ad-and-content database. The method 404 proceeds to an indication of "END," which is simply to illustrate an end to the sequence of operations described above. It should be recognized that the method 404 described is by way of example and it may either include additional operations not described here or exclude any of the operations that are described.

Figure 8:
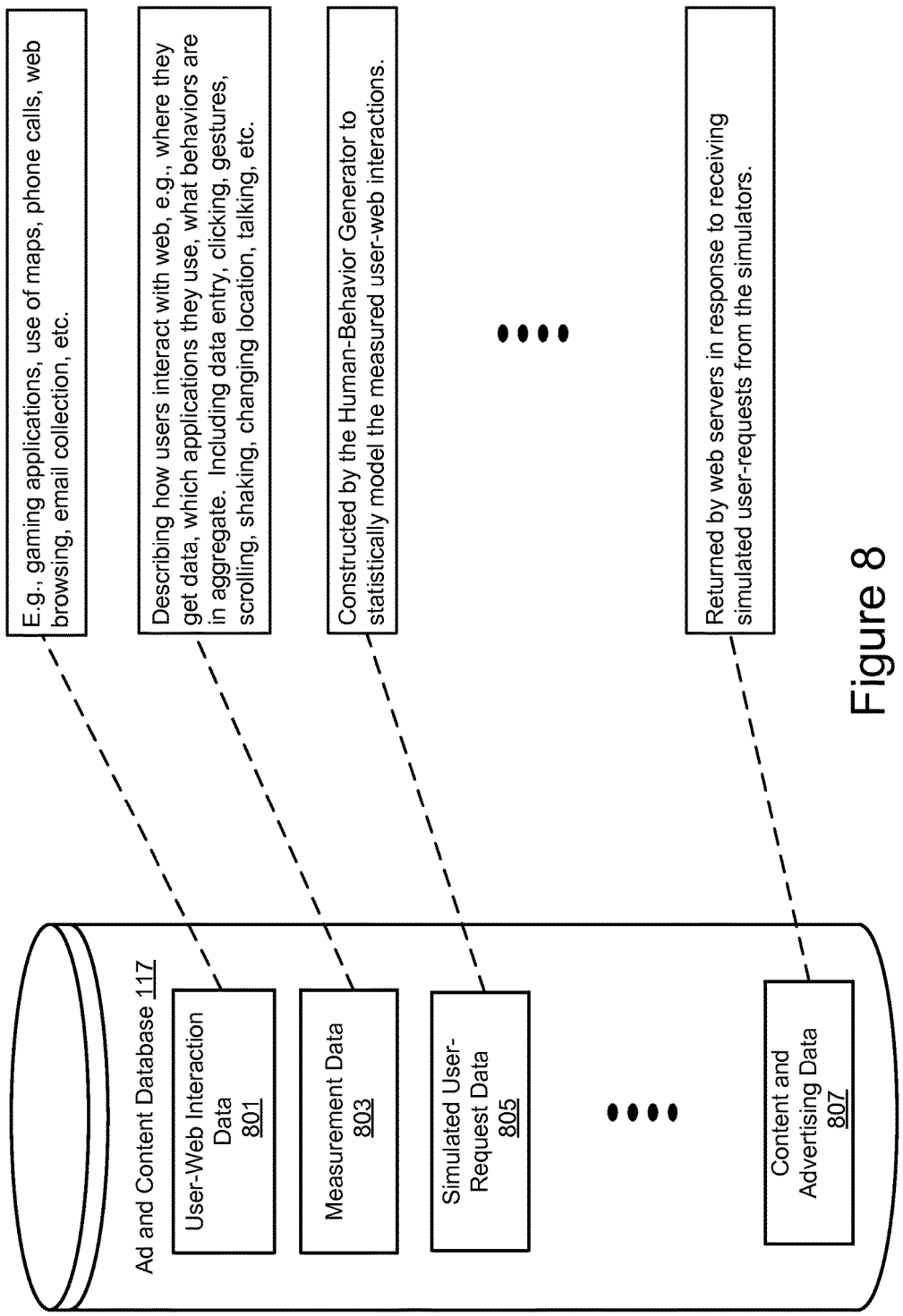
FIG. 8 is a block diagram illustrating one embodiment of data storage in accordance with the present invention.

Referring now to FIG. 8, one embodiment of an Ad-and-Content database 117 in accordance with the present invention is illustrated and described. The Ad-and-Content database 117 is data storage for storing data useful for the analytics engine 118 (in the analytics server 104) to perform its functionality. In the illustrated embodiment, the Ad-and-Content database 117 stores user-web interaction data 801, including, for example, gaming applications, use of maps, telephone calls, web browsing, email collection etc. The Ad-and-Content database 117 also includes measurement data 803. Examples of measurement data 803 is types of data that describe how users interact with websites, e.g., where they get their data, which applications they use, what behaviors are in aggregate, including data entry, clicking, gestures, scrolling, shaking, changing location, talking etc. The Ad-and-Content database 117 includes simulated user-request data 805 including data constructed by the human-behavior generator (e.g., human-behavior generator 115a or 115b) to statistically model the measured user-web interactions. The Ad-and-Content database 117 includes content and advertising data 807 including data returned by web servers in response to receiving simulated user-requests from the simulators.

Systems and methods for measuring user behavior patterns from mobile web-connected devices are described here. The systems and methods determine advertising ("ad") and content visibility on mobile devices and other indications of attention to or engagement with advertising or content both within servers, and on network connections. In the above description, for purposes of explanation, numerous specific details were set forth. It will be apparent, however, that the disclosed technologies can be practiced without these specific details. In other instances, structures and devices are shown in block diagram form. For example, the disclosed technologies are described in one embodiment below with reference to user interfaces and particular hardware. Moreover, the technologies are disclosed above primarily in the context of the Internet and on-line advertising; however, the disclosed technologies apply to other types of advertising.

Reference in the specification to "one embodiment" or "an embodiment" means that a particular feature, structure, or characteristic described in connection with the embodiment is included in at least one embodiment of the disclosed technologies. The appearances of the phrase "in one embodiment" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware embodiment, an entirely software embodiment or an embodiment containing both hardware and software elements. In one embodiment, the technology is implemented in software, which includes but is not limited to firmware, resident software, microcode, etc.

Furthermore, the disclosed technologies can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the embodiments of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present invention can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A method of identifying advertising specific to entities, comprising:
 receiving, by a behavior generator server, a plurality of user interaction data, the user interaction data corresponding to web-based requests from human users performed via mobile web-connected devices;
 determining, by the behavior generator server, one or more behavior patterns of human users from mobile web-connected devices;
 simulating, using a mobile device simulator within a non-mobile computing device, a plurality of mobile requests for web-based resources, wherein the plurality of simulated mobile requests are transmitted to web servers using mobile web access protocols;

for each particular request of the plurality of simulated mobile requests:

(a) determining one or more mobile user interactions to simulate during the particular request, based on the determined behavior patterns from mobile web-connected devices; and (b) using the mobile device simulator to simulate the determined mobile user interactions, from the non-mobile computing device, during the particular request for web-based resources;

collecting, by a data collection server, responses to the plurality of simulated mobile requests, the responses including advertising specific to certain entities and information about the advertising; and determining elements relating to the advertising specific to the certain entities, including an identification of the specific entity.

2. The method of claim 1, wherein the plurality of user interaction data is received from at least one of a group of a cellular telephone, a tablet device, and a computing device connected to an actual mobile device.

3. The method of claim 1, wherein determining the elements relating to the advertising specific to the certain entities includes determining a path by which the advertising traveled to the data collection server.

4. The method of claim 1, wherein the received plurality of user interaction data includes location data for a plurality of mobile web interaction sessions executed via the mobile web-connected devices, and wherein determining the behavior patterns of human users from mobile web-connected devices includes determining location patterns of the mobile web-connected devices during the mobile web interaction sessions.

5. The method of claim 1, wherein the received plurality of user interaction data includes device type data for a plurality of mobile web interaction sessions executed via the mobile web-connected devices, and wherein determining the behavior patterns of human users from mobile web-connected devices includes determining patterns of device type usage of the mobile web-connected devices during the mobile web interaction sessions.

6. The method of claim 1, wherein the received plurality of user interaction data includes data identifying particular mobile applications used during a plurality of mobile web interaction sessions executed via the mobile web-connected devices, and wherein determining the behavior patterns of human users from mobile web-connected devices includes determining mobile application usage patterns during the mobile web interaction sessions.

7. The method of claim 1, wherein determining the elements relating to the advertising specific to the certain entities includes determining:

(a) an identification of the specific advertising entity, (b) the size of the advertising transmitted in response to the plurality of simulated mobile requests, (c) the screen placement of the advertising transmitted in response to the plurality of simulated mobile requests, and (d) the network path by which the advertising was received in response to the plurality of simulated mobile requests.

8. The method of claim 1, wherein generating the plurality of simulated mobile requests for web-based resources comprises:

determining a particular mobile application to simulate for the mobile requests for web-based resources; and generating the mobile requests for web-based resources to simulate requests generated by the particular mobile application, and wherein the method further comprises:

simulating the mobile requests from the particular mobile application, using the mobile device simulator within the non-mobile computing device.

9. The method of claim 1, wherein determining the elements relating to the advertising specific to the certain entities includes determining the content visibility of the advertising on mobile devices.

10. The method of claim 1, wherein for a first request of the plurality of simulated mobile requests, simulating the determined mobile user interactions during the particular request for web-based resources, comprises:

using the mobile device simulator to simulate changing a physical location of a simulated mobile device during the particular request for web-based resources.

11. A computer-program product for identifying advertising specific to entities, the computer-program product comprising a non-transitory computer-usable medium including a computer-readable program, wherein the computer-readable program when executed on a computer causes the computer to:

receive a plurality of user interaction data, the user interaction data corresponding to web-based requests from human users performed via mobile web-connected devices;

determine one or more behavior patterns of human users from mobile web-connected devices; simulate, within a non-mobile computing device, a plurality of mobile requests for web-based resources, wherein the plurality of simulated mobile requests are transmitted using mobile web access protocols; for each particular request of the plurality of simulated mobile requests:

(a) determine one or more mobile user interactions to simulate during the particular request, based on the determined behavior patterns from mobile web-connected devices; and (b) simulate the determined mobile user interactions, from the non-mobile computing device, during the particular request for web-based resources;

collect responses to the plurality of simulated mobile requests, the responses including advertising specific to certain entities and information about the advertising; and determine elements relating to the advertising specific to the certain entities, including an identification of the specific entity.

12. The computer-program product of claim 11, wherein the plurality of user interaction data is received from at least one of a group of a cellular telephone, a tablet device, and a computing device connected to an actual mobile device.

13. The computer-program product of claim 11, wherein determining the elements relating to the advertising specific to the certain entities includes determining a path by which the advertising traveled to a data collection server.

14. The computer-program product of claim 11, wherein determining the elements relating to the advertising specific to the certain entities includes determining the content visibility of the advertising on mobile devices.

15. The computer-program product of claim 11, wherein for a first request of the plurality of simulated mobile requests, simulating the determined mobile user interactions during the particular request for web-based resources, comprises:
using the mobile device simulator to simulate changing a physical location of a simulated mobile device during the particular request for web-based resources.

16. A system for identifying advertising specific to entities, comprising:
a processing unit comprising one or more processors; and
memory storing instructions that when executed cause the processing unit to:
receive, via a behavior generator server of the system, a plurality of user interaction data, the user interaction data corresponding to web-based requests from human users performed via mobile web-connected devices;
determine, via the behavior generator server of the system, one or more behavior patterns of human users from mobile web-connected devices;
simulate, using a mobile device simulator within a non-mobile computing device of the system, a plurality of mobile requests for web-based resources, wherein the plurality of simulated mobile requests are transmitted mobile web access protocols;
for each particular request of the plurality of simulated mobile requests:
(a) determine one or more mobile user interactions to simulate during the particular request, based on the determined behavior patterns from mobile web-connected devices; and
(b) simulate the determined mobile user interactions, from the non-mobile computing device, during the particular request for web-based resources;
collect, via a data collection server of the system, responses to the plurality of simulated mobile requests, the responses including advertising specific to certain entities and information about the advertising; and
determine elements relating to the advertising specific to the certain entities, including an identification of the specific entity.

17. The system of claim 16, wherein the plurality of user interaction data is received from at least one of a group of a cellular telephone, a tablet device, and a computing device connected to an actual mobile device.

18. The system of claim 16, wherein at least one of the certain entities is an advertiser.

19. The system of claim 16, wherein at least one of the certain entities is a publisher from a list of publishers.

20. The system of claim 16, wherein at least one of the certain entities is one from a list of companies involved in the serving or measurement of the advertising.

21. The system of claim 16, wherein determining the elements relating to the advertising specific to the certain entities includes determining a path by which the advertising traveled to the data collection server.

22. The system of claim 16, wherein determining the elements relating to the advertising specific to the certain entities includes determining the content visibility of the advertising on mobile devices.

23. The system of claim 16, wherein for a first request of the plurality of simulated mobile requests, simulating the determined mobile user interactions during the particular request for web-based resources, comprises:
using the mobile device simulator to simulate changing a physical location of a simulated mobile device during the particular request for web-based resources.

* * * * *

UNITED STATES PATENT AND TRADEMARK OFFICE
CERTIFICATE OF CORRECTION

PATENT NO. : 10,068,250 B2
APPLICATION NO. : 14/213623
DATED : September 4, 2018
INVENTOR(S) : Gralla et al.

It is certified that error appears in the above-identified patent and that said Letters Patent is hereby corrected as shown below:

In the Drawings

On sheet 5 of 8, in Figure 5, under Reference Numeral 502, Line 2, delete "INERACTIONS" and insert -- INTERACTIONS --, therefor.

In the Specification

In Column 5, Line 47, delete "17n." and insert -- 107n. --, therefor.

Signed and Sealed this
Ninth Day of July, 2019

Andrei Iancu
*Director of the United States Patent and Trademark Office*